Figure 1:
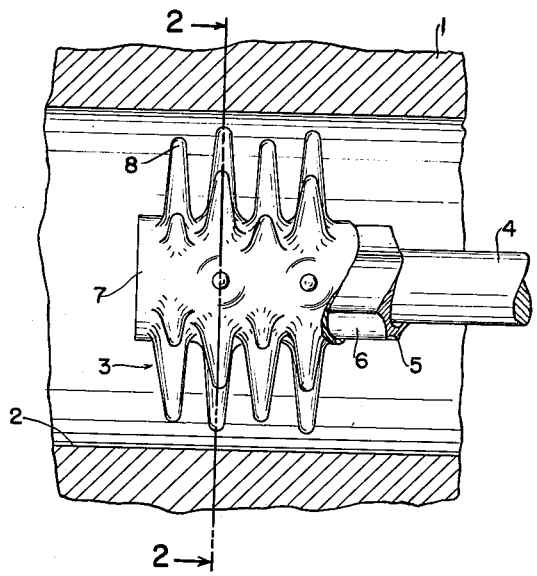

June 26, 1962

W. H. JENS 3,041,262

REACTOR FUEL ELEMENT

Filed Nov. 13, 1956

INVENTOR
WAYNE H. JENS
BY
ATTORNEYS

United States Patent Office 3,041,262
Patented June 26, 1962

3,041,262
REACTOR FUEL ELEMENT
Wayne H. Jens, Briarcliff Manor, N.Y., assignor, by mesne assignments, to United Nuclear Corporation, New York, N.Y., a corporation of Delaware
Filed Nov. 13, 1956, Ser. No. 621,558
2 Claims. (Cl. 204—193.2)

This invention relates to nuclear reactors and more particularly to fuel elements for nuclear reactors utilizing fluids, liquid or gaseous, as coolants and working fluids.

In power producing nuclear reactors it is necessary to provide means for continuously removing the heat generated by the reactor from the region in which the heat is produced. Moreover, the heat must be transferred to the working fluid which, in turn, conveys the heat to utilization apparatus such as a turbine. Where the reactor is of the type using a gaseous or liquid fluid simultaneously as the reactor coolant and as the working fluid there are two basic problems which are met and must be solved before a practical power reactor can come into being. First, means must be found which effectively precludes contamination of the working fluid with radioactive products of the fission process. Second, effective and efficient means must be found for transferring heat from the vicinity of the fission process to the working fluid. The latter is a specific variant of the general and long-standing problem of how to provide rapid and efficient transfer of heat from a solid medium to a gaseous or liquid medium.

Although the general principles of heat transfer are well known, collateral considerations peculiar to each application frequently demand a new solution to the basic problem. This is especially true in nuclear reactor engineering where the fission process and its attendant radioactive products impose limitations—necessitating the means stated first above—not encountered in the more conventional applications of heat transfer techniques.

I have invented a fuel element for a power producing nuclear reactor of the type using a gaseous or liquid working fluid which provides highly efficient transfer of heat from the fissionable material in which heat is generated to a gaseous or liquid working fluid. The construction of my new fuel element also provides a high degree of assurance against radiation products being liberated from the fissionable material of the reactor into the coolant and working fluid where these radiation products could be conveyed beyond the locations protected by the reactor shielding.

According to my invention, a fuel element for a nuclear reactor comprises a central core of fissionable material surrounded by a jacket which is spaced from the core. The jacket is provided with a plurality of external protuberant parts distributed over the jacket. A fluid having a high thermal conductivity substantially fills the space between the core and the jacket to transfer heat from the former to the latter. The protuberant parts of the jacket provide an extended surface which is a highly efficient radiator and conductor of heat from the jacket to the working fluid which is made to flow over the extended surface of the jacket. At the same time the jacket serves to isolate physically the fissionable material from the working fluid so that the latter is not subject to contamination with radioactive products of the fission process.

Figure 2:
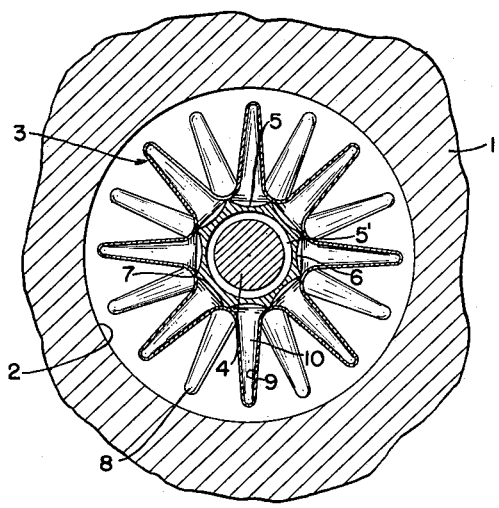

In the following portion of the specification I describe my invention and set forth its important features in terms of a presently preferred embodiment so that the invention may be fully understood. In the course of the description of the preferred embodiment reference is made to the accompanying drawings, in which:

FIG. 1 is an elevation, partly broken away, of a nuclear reactor fuel element in a reactor; and FIG. 2 is a sectional view taken along the line 2—2 of the fuel element of FIG. 1.

In the drawings, I show at 1 a portion of the moderator structure of a nuclear reactor. This moderator may be a solid material such as graphite or a contained volume of liquid moderator such as light or heavy water. At 2 there is indicated a cylindrical void in the body of the moderator into which the fuel element according to my invention is inserted. A stream of liquid or gaseous coolant and working fluid, such as helium, is pumped continuously through the void 2 and over the fuel element indicated generally at 3. As the working fluid passes through the void 2 it receives heat from the fuel element and is then conducted to a turbine or boiler where the heat is used to produce power.

This embodiment of my invention comprises an elongated cartridge or core of fissionable material 4 contained within a sealed metallic cladding tube 5. The tube is made of any suitable material which is resistant to the high temperatures, radiation and corrosion encountered in the reactor. A material which is satisfactory for this purpose is stainless steel.

The types of fuel adaptable to my invention are many and varied. Ceramic fuels, such as uranium dioxide and uranium carbide, may be compacted into the tube 5 before it is sealed. If sufficient pressure is applied in the compacting process a good thermal bond between the fuel 4 and the tube 5 will be obtained.

Powdered ceramic or metallic fissionable material mixed with a liquid metal such as sodium or potassium may also be used as fuel. The liquefiable metal of a mixture of this kind insures good thermal contact with the tube 5 when this form of fuel charge is used.

Where it is desired to use solid slugs of metallic uranium or plutonium as reactor fuel, good thermal contact between the slug and the tube 5 may be obtained with pressure or metallurgical bonds between them. However, in a particularly good alternative, illustrated in the drawings, the dimensions of the slug of fissionable material 4 are made smaller than the internal dimensions of the tube and, before the cladding tube 5 is sealed, the intervening space 5' is substantially filled with a metal which is liquefiable at reactor operating temperatures. Sodium potassium, and alloys of these metals are examples of satisfactory metals for this purpose.

In this embodiment the external surface of the tube 5 is machined to a polygonal—specifically, octagonal—cross-section and the lands 6 are made slightly concave as is best seen in FIG. 2. This cartridge of metal-clad fissionable material, the central core of my new fuel element, is inserted in an outer jacket 7 which is basically tubular and surrounds the fuel cartridge 5. Its internal surface bears on the longitudinal ridges of the tube.

The jacket 7 is provided with an external extended surface formed by a plurality of protuberant parts. In this preferred embodiment these protuberant parts are the radially extending spines 8. These spines are distributed in orderly fashion over the surface of the tube in the following manner. Eight spines are arranged around the circumference at regular intervals with their axes lying in substantially the same radial plane of the tube. Eight more spines are similarly arranged about the circumference of the jacket with their axes lying in a radial plane which is displaced longitudinally of the jacket with respect to the first radial plane. This second group of spines is also angularly displaced with respect to the first group so that, in an axial view of the fuel element, the spines in the second group are between adjacent spines of the first group as seen in FIG. 2. Similar groups of spines are arranged along the whole length of the jacket. An extended surface of this kind insures that the flow of coolant over the jacket will be highly turbulent and efficient transfer of heat from the extended surface to the coolant fluid will result.

If the material from which the jacket is made has sufficiently high thermal conductivity for the particular application the spines may be solid. In such case, and according to my invention, the space between the cladding tube 5 and the jacket 7 is filled with a fluid of high thermal conductivity to provide a good heat transfer by conduction and convection from the cartridge to the jacket. In the jacket the heat flows into all the spines and thence into the fluid coolant flowing over the extended external surface of the fuel element. In this preferred embodiment, which, at present, is the most efficient known to me, the jacket is made of stainless steel and the spines are hollow; that is, they have internal cavities 9 which are in communication with the space between the tube 5 and the jacket 7, as is seen in the cross-sectional view of FIG. 2. Here, the space between the tube and the jacket and the cavities within the spines are filled with a fluid 10 of high thermal conductivity. This may be a metallic element or an alloy of metallic elements, such as sodium and potassium, which are liquefiable at reactor operating temperatures. Of course, some provision must be made for expansion of the fluid at high temperatures. Being in contact with the tube and the entire internal surface of the jacket, including the internal surfaces of the cavities within the spines, the fluid provides exceptionally good heat transfer to the jacket and thence to the coolant fluid forced over the extended surface of the fuel elements. If desired, circulation of the fluid by convection within the space and all the cavities may be obtained by cutting connecting channels into the surface of the tube 5 or jacket 7.

In a complete reactor, the fuel element I have just described would be only one of many similar fuel elements, each of which would be located in a void within the moderator structure.

To those skilled in the art it will be readily apparent that my new fuel element has the advantage of an extended surface from which heat may be transferred to the fluid coolant which permits a high power density to be obtained. There is also an exceptionally high thermal conductivity between the cartridge in which the heat is generated and the external jacket which leads to an exceptionally effective use of the extended heat transfer surface. Moreover, where the clad cartridge and the jacket are used, as in the preferred embodiment described in detail, an extra containment of fission products is provided in the event that a fuel element cartridge ruptures as may happen under the extreme service conditions imposed by the high temperatures and degenerative radiation effects encountered in a reactor.

A complete description of one embodiment of my invention has been given so that the invention may be thoroughly understood by those skilled in the art. However, it should be understood that the invention is not limited to the specific details set forth above, but is only to be limited by the scope of the subjoined claims.

I claim:

1. A fuel element for a fluid-cooled nuclear reactor, which element comprises a closed tube, fissionable fuel material substantially filling said tube, the external surface of said tube being substantially polygonal in cross-section, a tubular jacket surrounding said tube and having an internal radius substantially equal to the distance from the axis of said tube to an apex of the polygolal cross-section of said tube such that the tube is supported within said jacket by bearing on the internal wall only along the apices of the cross-section of the tube and such that there are spaces defined by the lateral surfaces of the tube and the interior surface of said jacket, a plurality of outwardly extending hollow spines distributed over the surface of the jacket, the interior of said spines being in communication with the spaces between the surfaces of the tube and the interior surface of the jacket, and a metal liquefiable at reactor operating temperatures substantially filling the spaces within the spines and between the tube and the jacket, and said liquefiable metal having a high thermal conductivity relative to the material of the jacket.

2. A fuel element according to claim 1 in which the jacket consists of stainless steel and in which the liquefiable metal comprises at least one metal selected from the group consisting of sodium and potassium.

References Cited in the file of this patent

UNITED STATES PATENTS

| 2,131,929 | Amme | Oct. 4, 1938 |
| 2,385,080 | Heymann | Sept. 18, 1945 |
| 2,434,519 | Raskin | Jan. 13, 1948 |
| 2,548,092 | Bartlett et al. | Apr. 10, 1951 |
| 2,763,570 | Shepard et al. | Sept. 18, 1956 |
| 2,831,807 | McGarry | Apr. 22, 1958 |
| 2,841,545 | Zinn | July 1, 1958 |
| 2,852,456 | Wade | Sept. 16, 1958 |
| 2,870,076 | Koch | Jan. 20, 1959 |

OTHER REFERENCES

International Conference on Peaceful Uses of Atomic Energy, 1955, vol. 9, pp. 179–195.

Research Reactors TID 5275, Library date October 10, 1955, available from Atomic Energy Commission, Oak Ridge, Tenn., pages 395–397, 400.

Principles of Nuclear Reactor Engineering by Samuel Glasstone, D. Van Nostrand Co., N.Y., 1st edition, July 1955, pages 765, 766.

Selected Laboratory Equipment Catalog No. 50, Schaar & Co., 754 W. Lexington St., Chicago, Ill. (1950), pages 222, 223.